(12) United States Patent
Grape et al.

(10) Patent No.: US 7,278,799 B2
(45) Date of Patent: Oct. 9, 2007

(54) HUB ASSEMBLY AND METHOD FOR ADJUSTABLE MOUNTING ON SHAFT

(75) Inventors: Sean Grape, Rochester, NY (US); Anthony C. Kocienski, Rochester, NY (US)

(73) Assignee: SPX Corporation, Charlotte, NC (US)

( * ) Notice: Subject to any disclaimer, the term of this patent is extended or adjusted under 35 U.S.C. 154(b) by 276 days.

(21) Appl. No.: 10/960,979

(22) Filed: Oct. 12, 2004

(65) Prior Publication Data

US 2006/0078367 A1   Apr. 13, 2006

(51) Int. Cl.
*F16B 9/00* (2006.01)

(52) U.S. Cl. .................. 403/1; 403/195; 403/335; 403/337; 403/338

(58) Field of Classification Search .......... 403/1, 403/71, 191, 195, 196, 233–236, 296, 308, 403/312, 335–340, 344, 371; 277/423; 366/330.2, 366/331; 416/204 R, 244 R; 285/349, 205, 285/211, 220
See application file for complete search history.

(56) References Cited

U.S. PATENT DOCUMENTS

| 808,082 | A | * | 12/1905 | Fuller | 277/547 |
|---|---|---|---|---|---|
| 3,025,070 | A | * | 3/1962 | Copes | 277/370 |
| 3,792,938 | A | * | 2/1974 | Wilde | 416/244 R |
| 3,865,497 | A | * | 2/1975 | Bratt et al. | 416/244 R |
| 4,240,762 | A | * | 12/1980 | Lobanoff | 403/287 |
| 4,576,384 | A | * | 3/1986 | Azibert | 277/370 |
| 4,711,449 | A | * | 12/1987 | Ochab | 403/344 |
| 5,306,096 | A | * | 4/1994 | Tuns et al. | 403/344 |
| 5,573,290 | A | * | 11/1996 | Smith | 403/344 |
| 5,662,340 | A | * | 9/1997 | Bessette et al. | 277/374 |
| 6,109,817 | A | * | 8/2000 | Burns et al. | 403/312 |
| 6,394,464 | B1 | * | 5/2002 | Moreau | 277/603 |
| 6,435,832 | B1 | * | 8/2002 | Fasano | 416/244 R |
| 6,457,720 | B1 | * | 10/2002 | London | 277/370 |
| 6,745,909 | B1 | * | 6/2004 | Lai | 403/296 |
| 6,824,471 | B2 | * | 11/2004 | Kamenov | 403/344 |
| 7,000,905 | B1 | * | 2/2006 | Lutter et al. | 403/344 |
| 2006/0147259 | A1 | * | 7/2006 | Hu et al. | 403/343 |

* cited by examiner

*Primary Examiner*—Daniel P. Stodola
*Assistant Examiner*—Victor MacArthur
(74) *Attorney, Agent, or Firm*—Baker & Hostetler LLP

(57) ABSTRACT

A hub for removable mounting onto a shaft uses a locking ring having an inner diameter that surrounds the shaft and frictionally engages the shaft to fix the locking ring against the shaft axially and rotationally, a first annular hub component that is mounted to the locking ring, and a second annular hub component that is mounted to the first annular hub component.

18 Claims, 1 Drawing Sheet

HUB ASSEMBLY AND METHOD FOR ADJUSTABLE MOUNTING ON SHAFT

FIELD OF THE INVENTION

The present invention pertains to the field of hubs that are mounted onto a rotating shaft, for example, hubs that support impellers that are mounted to a rotating mixer shaft. More particularly, the invention pertains to hubs that can be adjustably mounted at different axial locations along the length of the shaft.

BACKGROUND OF THE INVENTION

Mixing devices are in wide use in industry, and many mixing devices include a large vessel which contains a liquid to be mixed, and a typically vertical impeller shaft running down some or all of the vertical length inside the vessel. The impeller shaft is typically rotatably driven by a motor, usually located at the top of the vessel, and at one or several locations on the length of the shaft radially extending impellers are mounted which have paddles or blade type features along some or all of the length and which mix and/or otherwise impart energy to the fluid inside the vessel.

In some instances, a motor and drive assembly along with some sealing arrangement are mounted at a top opening of the vessel, and the shaft is suspended, so that it hangs down from this motor with its lower end being a free end spaced above the bottom of the vessel. In the case of a long shaft, this type of arrangement may also include one or more "steady bearings", which are radially mounted supports that maintain the shaft in its axial position. Some shafts will also have a bottom bearing mounted to the bottom of the vessel, so that the lower stub of the shaft is rotatably supported at the bottom inside of the vessel.

In some instances, the impeller components are welded directly onto the shaft in order to extend radially outward from the shaft. This arrangement has a disadvantage that it is relatively permanent and once an axial location is selected and the blade is mounted at that location, it is now difficult to then go back and adjust the blade location without time consuming and disadvantageous further welding processes. Therefore, these welded systems are not very adjustable in the field. Further, performing a since welding process at the final installation location may be undesirable, the entire shaft and impeller assembly must sometimes be shipped in their final configuration, which can be bulky. Therefore, these conventional designs also do not benefit from being shipped broken down and assembled at their final installation site easily.

Accordingly, there is a need in the art for a apparatus and method which can be easily mounted onto a shaft and at a desired axial location, and which can also be easily adjusted to a different axial location and/or removed entirely when desired.

SUMMARY OF THE INVENTION

The foregoing needs are met, to a great extent, by the present invention, wherein in one aspect an apparatus is provided that in some embodiments provides a apparatus and method which can be easily mounted onto a shaft at a desired axial location, and which can also be easily adjusted to a different axial location and/or removed entirely when desired.

In accordance with one embodiment of the present invention, A hub for removable mounting onto a shaft comprising a locking ring having an inner diameter that surrounds the shaft and frictionally engages the shaft to fix the locking ring against the shaft axially and rotationally, a first annular hub component that is mounted to the locking ring, and a second annular hub component that is mounted to the first annular hub component.

In accordance with another embodiment of the present invention, a hub for removable mounting onto a shaft comprising a locking means having an inner diameter that surrounds the shaft and frictionally engages the shaft to fix the locking means against the shaft axially and rotationally, a first annular hub component that is mounted to the locking means, and a second annular hub component that is mounted to the first annular hub component.

In accordance with yet another embodiment of the present invention, a method for removably mounting a half onto a shaft comprising attaching a locking ring having an inner diameter to surround the shaft and frictionally engage the shaft to fix the locking ring against the shaft axially and rotationally, mounting a first annular hub component to the locking ring, and mounting a second annular hub component to the first annular hub component.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
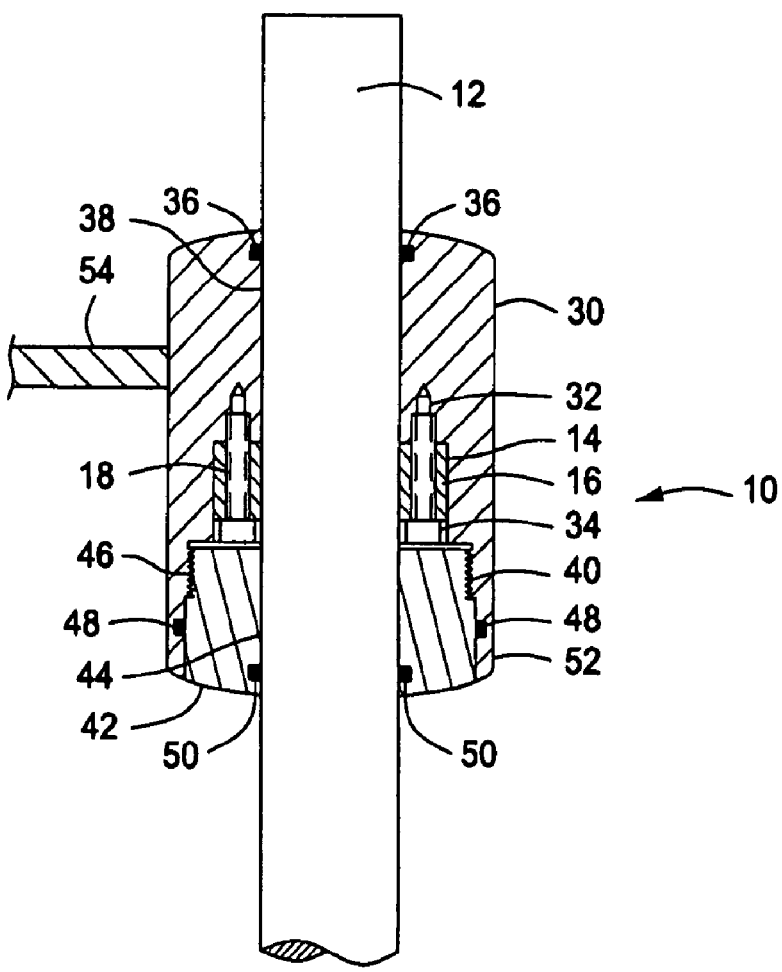
FIG. 1 is a side view showing a shaft and, in cross section, a hub assembly according to a preferred embodiment of the present invention.

Preferred embodiments of the invention will now be described with reference to the drawing figures, in which like reference numerals refer to like parts throughout. Turning to FIG. 1, a hub assembly 10 is depicted in a configuration mounted onto a shaft 12. The shaft 12 may be, for example, a vertical drive shaft that is suspended or otherwise mounted in the inside region of a fluid-containing vessel. In this example, the drive shaft 12 is rotationally driven by a motor and/or a gear box and it is desired to mount radially extending impeller members such as paddles or blades onto the shaft so that rotation of the shaft 12 will move the impellers through the fluid.

Figure 2:
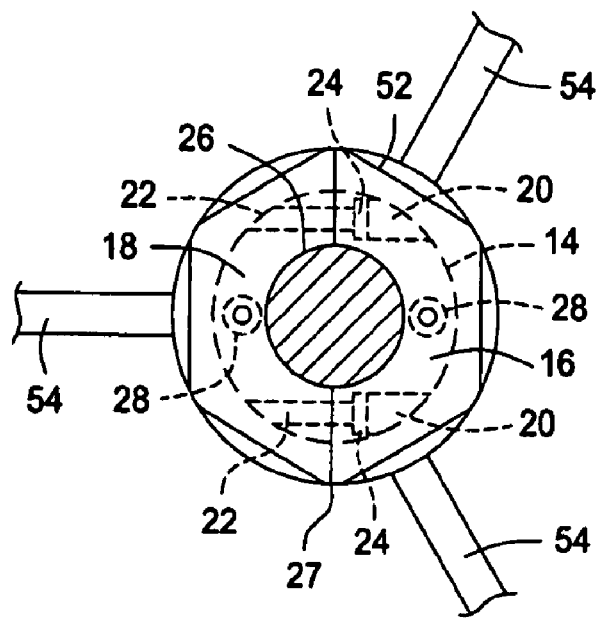
FIG. 2 is a bottom view of the hub assembly of FIG. 1, with the shaft shown in cross section.

The hub assembly 10 includes a two piece split collar 14 that includes a first half 16 and a opposed second half 18, with each part 16 and 18 having a roughly "C-shape" in plan view. The first half 16 has a pair of counterbores 20 extending through it, with each counterbore 20 having a large diameter portion and a smaller diameter portion. The second half 18 has a pair of threaded through holes 22 extending through it that are aligned with the counterbores 20. The split collar 14 is installed onto the shaft 12 by aligning the two halves 16 and 18 as shown in the figures, and tightening a pair of screws or other threaded fasteners 24 such as for example screws, as seen in FIG. 2.

The screws 24 threadably engage the through holes 22 and pull the two halves 16 and 18 together. The split collar 14 has an inner diameter 26 that is sized very closely to the outer diameter of the shaft 12. The respective mating faces 27 of each half 16 and 18 remain spaced apart even when the screws 24 are fully tightened, so that fully tightening the screws provides a very tight frictional fit between the inner diameter 26 of the assembled split collar 14 and the outer diameter of the shaft 12. This frictional content resists both rotational and axial movement of the split collar 14 on the shaft 12. Thus, fully tightening the screws 24 effectively locates the split collar 14 onto the shaft 12 and provides a rigid mounting thereto.

The counterbores 20 are typically not threaded, while each through hole 22 is threaded in order to engage with the screw 24. The through hole 22 does not need to extend all the way through to the outside of the respective half 18, but this can in some instances provide simpler manufacturing. Although two screws 24 are illustrated as the fasteners for securing the two halves 16 and 18 together, in the case of a collar having a longer axial length, it may be desirable to have multiple pairs of screws axially spaced apart. The assembled split collar 14 also includes two axially oriented and generally unthreaded holes 28, whose function will be described in more detail later. These holes 28 are preferably straight bores running through from the top to the bottom of each half 16 and 18 respectively.

The adjustable hub assembly 10 further includes an upper impeller hub 30. The upper impeller hub 30 is a unitary toroidal ring having a pair of threaded bores 32. After the split collar 14 has been mounted on the shaft 12, the upper impeller hub 30 is moved downward so that it fits over the split collar 14, and a pair of fasteners 34 are tightened in order to draw the upper impeller hub 30 down and mount it over the split collar 14. The fasteners 34 are illustrated as being socket head screws which have a threaded engagement into their respective bores 32 as shown. Once the fasteners 34 have been tightened, the upper impeller hub 30 is now rigidly attached to the split collar 14 so that it is both rotationally and axially located onto the shaft 12. The upper impeller hub 30 has an inner diameter 38 that is preferably just slightly larger than the outer diameter of the shaft 12, with a minimum clearance, so that the upper impeller hub 30 can be slid along the length of the shaft 12, but is generally in a snug relationship therewith. An O-ring 36 is provided near the top of the upper impeller hub 30 in an appropriate groove on the inner surface of the upper impeller hub 30 and serves to prevent fluid from traveling down between the shaft 12 and the upper impeller hub 30. The O-ring 36 thus provides a sealing function and facilitates easy cleaning of the combined hub and shaft assembly. The upper impeller hub 30 also has a inner threaded recess 40 whose function is described in more detail below.

Although not illustrated, the inner surface 26 of one or both of the halves 16 and 18 can feature one or more flats, split keys or other features that engage corresponding flats, split keys or other features of the outer surface of the shaft 12 to positively prevent rotational slippage of the shaft 12 in the hub 10.

The adjustable hub assembly 10 further includes a lower sealing ring 42 which has an inner diameter 44 sized much like the inner diameter 36 so that the lower sealing ring 42 can be slid along the length of the shaft but is in a generally snug relationship therewith. The lower sealing ring 42 has an upper outwardly threaded region 46 which is threadably engaged with the threaded portion 40 so that spinning the lower sealing ring 42 relative to the upper impeller hub 30 pulls the lower sealing ring 40 upwards and into the position shown in FIG. 1. An O-ring 48 is provided in an appropriate groove to provide a seal between the upper impeller hub 30 and the lower sealing ring 42. Also, an O-ring 50 is provided in an appropriate groove to provide a seal with a shaft 12 similar to that provided by the O-ring 36. The lower sealing ring 40 may be provided with a set of flats 52 which facilitate using a wrench or other tool in order to spin the lower sealing ring 40 into the fully tightened position.

A clearance is provided between the top of the socket head screws 34 and the top surface of the lower sealing ring 40, so that the lower sealing ring 40 can be fully tightened onto the appropriate hub 30. Full tightening of the lower sealing ring 40 is achieved when the O-ring 48 is in full sealing contact. Any number of impellers and impeller hubs can be mounted on the shaft using one or more hubs 10.

When the hub assembly 10 is the in the assembled configuration shown in FIGS. 1 and 2, a hub assembly is provided that is removable, but, in the installed state is rigidly attached to the shaft both axially and radially. Such a hub is useful to support, for example, radially extending impellers, such an the impeller arm 54 which is schematically illustrated in FIG. 1. In some embodiments, the impellers typically extend at evenly spaced 90 degree or 120 degree intervals around the hub. The impeller such as impeller 52 can be pre-welded onto the upper impeller hub 30 at a manufacturing location. This embodiment of the present invention provides that the upper impeller hub 30 can be shipped disconnected from the shaft, and readily assembled onto the shaft at the final point of mixer assembly. Thus, it will be appreciated that the preferred embodiment provides at least two advantages including the ability to adjust the axial location of the impeller on the shaft whenever desired, and also the ability to ship the impeller in an unmounted state from the shaft. Any number of impellers and impeller hubs can be mounted on the shaft using one or more hubs 10.

The preferred method for assembling the hub 10 onto a shaft 12 will now be described. If the shaft has only one free end at the bottom, the first step would be to slide the upper impeller hub 30 to a location above the desired location of the hub. The next step is to select an axial location for the hub 10, and to locate the halves 16 and 18 opposite each other on the shaft 12, insert the screws 24, and tighten the screws 24 so that the halves 16 and 18 are pulled together and the inner diameter of the split ring 14 formed by the halves 16 and 18 firmly frictionally engages against the outside of the shaft 12. At this point, the split collar 14 has been rigidly mounted onto the shaft 12.

The next step is to slide the upper impeller hub 30 downwardly along the shaft so that it fits over the split collar 14 and to tighten the two screws 34 to lock the upper impeller hub 30 onto the split collar 14.

Although two screws 180 degrees apart are illustrated for attaching the upper impeller hub 30 to the split collar 14, in the case of a particularly large collar, it may be desirable to use on a different number of fasteners, such as four fasteners each 45 degrees from the edge of the C, instead of the illustrated two fasteners each 90 degrees from the edge of the C.

The third step in the assembly process is to slide the lower sealing ring 40 upwards along the shaft 12 and to spin it via threaded connection with the upper impeller hub 30 until it is tight.

It will be appreciated that the finished hub assembly 10 has three O-ring seals, one O-ring seal 36 at the top, one O-ring seal 50 at the bottom, and a side O-ring seal 48 on the side. These three seals together prevent the mixed material from entering into the areas of the threaded bores and other internal areas of the hub, and thus provide for desirable sanitary characteristics. The O-rings can be for example any suitable type of elastomeric sealing ring, and may for example be rings made of Kalrez (available from Dupont) or peroxide cured EPDM.

Removal of the hub is accomplished by reversing the above steps.

The upper impeller hub 30 and lower sealing ring 40 may preferably be made of a metal such as 316L or another high alloy. These parts may be the same material or a similar material as the shaft. The split collar due to its desired frictional engagement with the shaft, may preferably be manufactured from a softer metal than the other components, such as for example Monel or Alloy 20, or may be manufactured from other materials.

It will also be appreciated that in the preferred embodiment, a substantially three-part overall hub arrangement is provided. The first part, which in the preferred embodiment is provided by a locking ring for example a split collar, is a component that is frictionally engaged onto the shaft and rotationally and axially locked onto the shaft by the friction. Two other components, (a top component, and a lower component) together encapsulate the locking ring and provide material sealing around the locking ring as well as a surface from which the impellers can extend radially. Besides a locking ring made of two C-shaped halves tabs, other locking rings can be implemented with upper and lower covering elements in keeping with other embodiments of the invention with desire.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A hub for removable mounting onto a shaft comprising:
   a locking ring having an inner diameter adapted to surround the shaft and frictionally engage the shaft to fix the locking ring against the shaft axially and rotationally;
   a first annular hub component that is mounted in direct contact with the locking ring; and
   a second annular hub component that is mounted to the first annular hub component, wherein the locking ring comprises two C-shaped half rings attached to each other by threaded fasteners, wherein the first hub component is a unitary annular hub attached to the locking ring by a pair of threaded fasteners that extend through a respective half ring and into the first hub component, and wherein the second hub component has threads, and the first hub component has threads, which mate with each other to attach the first and second hub components to each other.

2. A hub assembly according to claim 1, further comprising a plurality of impellers radially extending from one of the first and second hub components.

3. A hub assembly according to claim 1, further comprising a first O-ring groove on the first hub component and an O-ring disposed in the first O-ring groove and adapted to seal against the shaft.

4. A hub assembly according to claim 3, further comprising a second O-ring groove on the second hub component and an O-ring disposed in the second O-ring groove and adapted to seal against the shaft.

5. A hub assembly according to claim 4, further comprising a third O-ring groove provided on one of the first and second hub components, and an O-ring disposed in the groove and adapted to seal a mating location between the first and second hub components.

6. A hub assembly according to claim 1, wherein the threads on the second hub component are external and the threads on the first hub component are internal.

7. A hub for removable mounting onto a shaft comprising:
   a locking means having an inner diameter adapted to surround the shaft and frictionally engage the shaft to fix the locking means against the shaft axially and rotationally;
   a first annular hub component that is mounted in direct contact with the locking means; and
   a second annular hub component that is mounted to the first annular hub component, wherein the locking means comprises two C-shaped half rings attached to each other by threaded fasteners, wherein the first hub component is a unitary annular hub attached to the locking means by a pair of threaded fasteners that extend through a respective half ring and into the first hub component, and wherein the second hub component has threads, and the first hub component has threads, which mate with each other to attach the first and second hub components to each other.

8. A hub assembly according to claim 7, further comprising a plurality of impellers radial extending from one of the first and second hub components.

9. A hub assembly according to claim 7, further comprising a first O-ring groove on the first hub component and an O-ring disposed in the first O-ring groove and adapted to seal against the shaft.

10. A hub assembly according to claim 9, further comprising a second O-ring groove on the second hub component and an O-ring disposed in the second O-ring groove and adapted to seal against the shaft.

11. A hub assembly according to claim 10, further comprising a third O-ring groove provided on one of the first and second hub components, and an O-ring disposed in the groove and adapted to seal a mating location between the first and second hub components.

12. A hub assembly according to claim 7, wherein the threads on the second hub component are external and the threads on the first hub component are internal.

13. A method for removably mounting a hub onto a shaft comprising:
   attaching a locking ring having an inner diameter to surround the shaft and frictionally engage the shaft to fix the locking ring against the shaft axially and rotationally;
   mounting a first annular hub component to be in direct contact with the locking ring; and
   mounting a second annular hub component to the first annular hub component, wherein the step of attaching the locking ring comprises attaching two C-shaped half rings to each other by threaded fasteners, wherein the first hub component is a unitary annular hub attached to the locking ring by a pair of threaded fasteners that extend through a respective half ring and into the first hub component, wherein the second hub component has threads, and the first hub component has threads, which mate with each other to attach the first and second hub components to each other.

14. A method assembly according to claim 13, wherein a plurality of impellers radially extend from one of the first and second hub components.

15. A method according to claim 13, further comprising dispensing an O-ring in a first O-ring groove on the first hub component to seal against the shaft.

16. A method according to claim 15, further comprising dispensing an O-ring in a second O-ring groove on the second hub component to seal against the shaft.

17. A method according to claim 16, further comprising dispensing an O-ring in a third O-ring groove provided on one of the first and second hub components to seal a mating location between the first and second hub components.

18. A method according to claim 13, wherein the threads on the second hub component are external, and the threads on the first hub component are internal.

* * * * *